US008895890B2

(12) United States Patent
Baistrocchi et al.

(10) Patent No.: US 8,895,890 B2
(45) Date of Patent: Nov. 25, 2014

(54) LASER SCRIBING INSTALLATION FOR THE SUPERFICIAL TREATMENT OF MAGNETIC SHEETS WITH SPOTS OF ELLIPTIC SECTION

(75) Inventors: Matteo Baistrocchi, Milan (IT); Maurizio Baistrocchi, Milan (IT); Giuseppe Savant-Aira, Aglie' (IT); Ferruccio Mariotti, Aglie' (IT); Mauro Penasa, Aglie' (IT)

(73) Assignees: R.T.M. S.p.A., Agile' (TO) (IT); Gengroup S.R.L., Milan (IT); Baistrocchi, Matteo, Milan (IT)

( * ) Notice: Subject to any disclaimer, the term of this patent is extended or adjusted under 35 U.S.C. 154(b) by 824 days.

(21) Appl. No.: 13/055,323

(22) PCT Filed: Jul. 13, 2009

(86) PCT No.: PCT/EP2009/058938
§ 371 (c)(1),
(2), (4) Date: Apr. 14, 2011

(87) PCT Pub. No.: WO2010/010001
PCT Pub. Date: Jan. 28, 2010

(65) Prior Publication Data
US 2011/0186552 A1     Aug. 4, 2011

(30) Foreign Application Priority Data
Jul. 25, 2008   (IT) .............. TO2008A0573

(51) Int. Cl.
*B23K 26/14*     (2014.01)
*B23K 26/36*     (2014.01)
*B23K 26/08*     (2014.01)
*B23K 26/30*     (2014.01)

(52) U.S. Cl.
CPC ........... *B23K 26/367* (2013.01); *B23K 26/0815* (2013.01); *B23K 26/0846* (2013.01); *B23K 26/425* (2013.01)
USPC .................................................... 219/121.67

(58) Field of Classification Search
USPC ............ 219/121.67, 121.71, 121.72, 121.69, 219/121.75, 121.68, 121.74
See application file for complete search history.

(56) References Cited

U.S. PATENT DOCUMENTS 4,456,812 A * 6/1984 Neiheisel et al. ........ 219/121.85
4,535,218 A * 8/1985 Krause et al. ............ 219/121.68
(Continued)

FOREIGN PATENT DOCUMENTS

| EP | 0549357 A  | 6/1993 |
| EP | 1428640 A  | 6/2004 |
| EP | 1806202 A1 | 7/2007 |

OTHER PUBLICATIONS

Search Report from PCT/EP2009/058398.

*Primary Examiner* — Dana Ross
*Assistant Examiner* — Renee L Miller
(74) *Attorney, Agent, or Firm* — Banner & Witcoff, Ltd.

(57) ABSTRACT

A laser scribing installation for the treatment of grain oriented magnetic sheets, as strip in longitudinal movement, comprising a laser generator for a laser beam, a cylindrical telescopic optical group with varying focal distance for the formation of a laser beam with elliptic section having varying ellipticity as function of the focal distances and a rotating mirror scanner for scanning the laser beam according to a pre-defined angle. The scribing installation further comprises a parabolic reflector extended transversally to the strip for receiving the scanned laser beam and focusing the beam on the strip, as a greatly lengthened elliptic spot, along a treatment path, and wherein the telescopic group is adjustable for modifying the length of one of the axes in the elliptic section of the laser beam incident on the strip.

20 Claims, 7 Drawing Sheets

(56) References Cited

U.S. PATENT DOCUMENTS 5,382,773 A * 1/1995 Kurihara et al. ........... 219/121.7
5,891,764 A * 4/1999 Ishihara et al. ............... 438/151
2004/0228004 A1 11/2004 Sercel et al.
2005/0029239 A1* 2/2005 Matsumoto et al. ..... 219/121.72

* cited by examiner

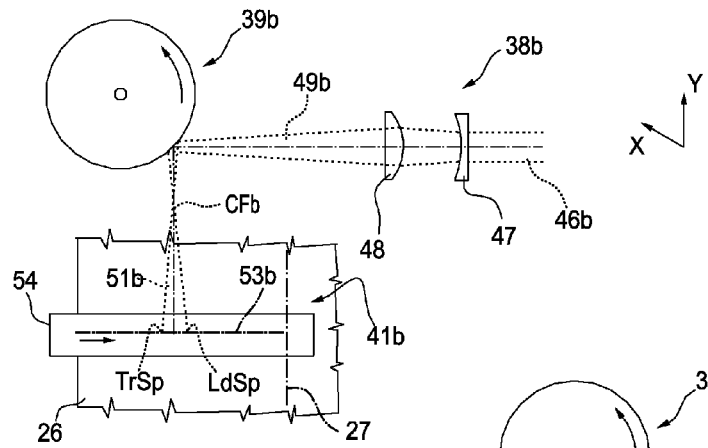
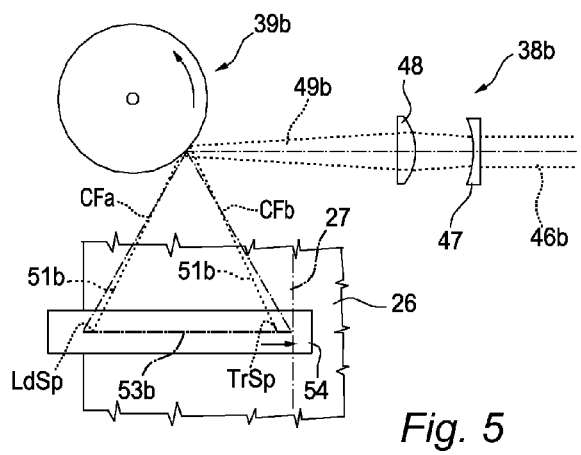
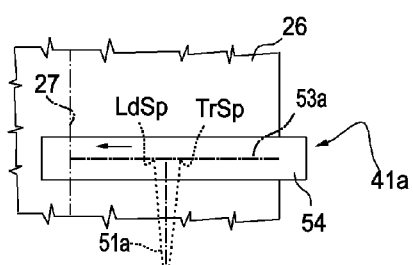
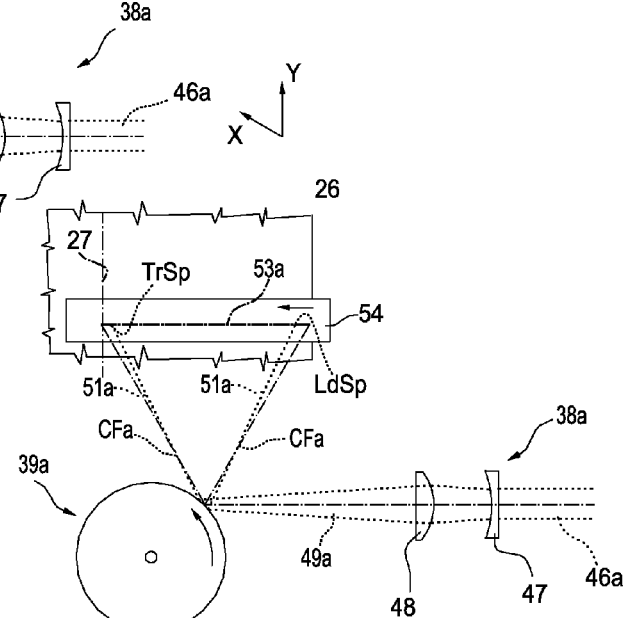
Fig. 4
Fig. 5
Fig. 6
Fig. 7

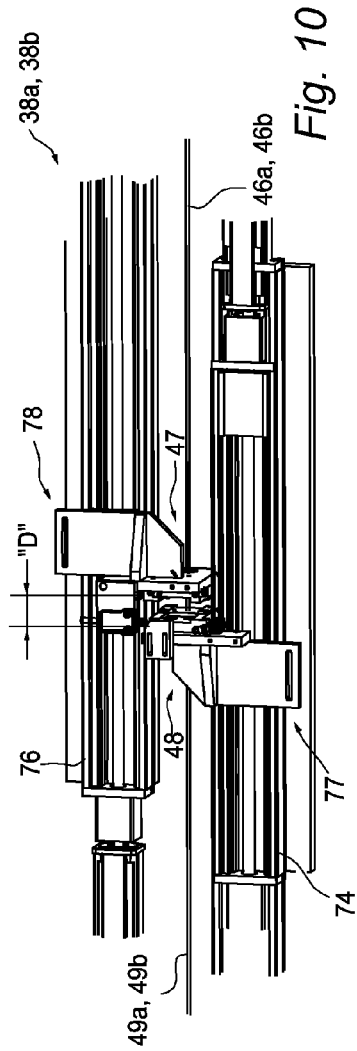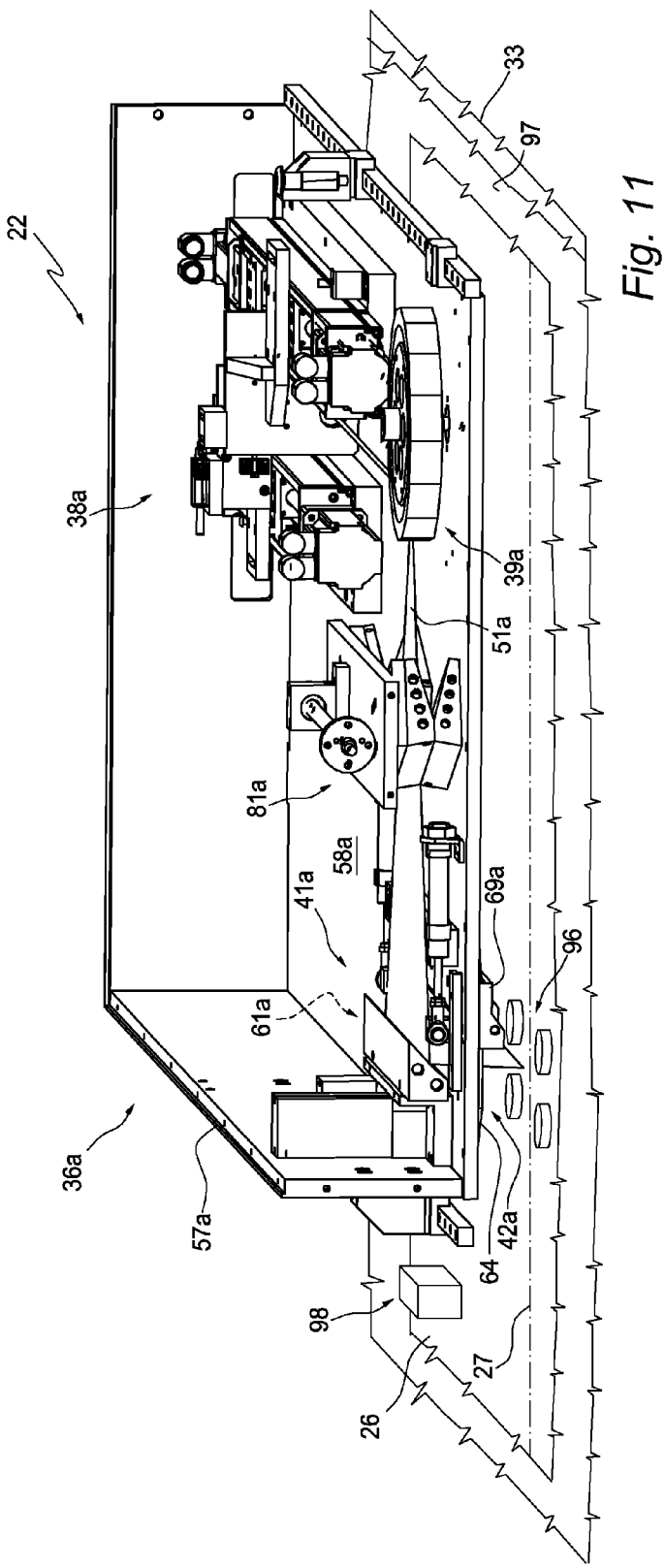

LASER SCRIBING INSTALLATION FOR THE SUPERFICIAL TREATMENT OF MAGNETIC SHEETS WITH SPOTS OF ELLIPTIC SECTION

CROSS REFERENCE TO RELATED APPLICATIONS

This application is a national phase of and claims the benefit of priority from PCT application number PCT/EP2009/058938 filed Jul. 13, 2009, which claims priority to Italian application number TO2008A000573 filed Jul. 25, 2008, both of which are incorporated herein by reference.

FIELD OF THE INVENTION

The present invention relates to a laser scribing installation for the superficial treatment of magnetic sheets with spots of elliptic section.

More specifically the invention refers to a laser scribing installation for the superficial treatment of oriented grain magnetic sheets, with spots of elliptic section, according to the main claims.

BACKGROUND OF THE INVENTION

The sheets of silicon steel with oriented magnetic grain find wide use in the production of cores for transformers; in this use, one of the characteristics of the material subjected to deep analysis relates to the energy dissipated on the operation of the transformer. The losses depend on several factors and, in particular, the movement of the walls of the magnetic domains, the grain sizes of the sheet and the direction of the crystalline reticulum of the grain with respect to the surface of the sheet.

A first solution is to provide sheets of silicon steel with high oriented grain, having given dimensions of the grain and low thickness: The obtained results are good, but cannot be substantially improved and in industrially acceptable way. In particular it has been found that the optimal dimension of grains is of some millimeter while, with respect to the thickness of the sheet, it is not convenient to go below determined values, in view of the cost of the treatments, and the fact that it reduces the "spatial factor" between volume of the sheet and volume of the insulating coverings.

An important factor that affects the losses in the cores relates to the dimensions of the magnetic domains. Applying a mechanical tension to the sheet, an anisotropy in the plan of the sheet is induced, which, in presence of the typical structure of the used material (texture of Goss), increases the energetic difference of magnetization between the crystallographic direction, parallel to the direction of lamination, and the direction perpendicular to the direction of lamination. The balance between magneto-static energy and energy of the walls of the dominions is in favor of the energy of the walls, causing the formation of a greater number of walls that become finer and closer. In such a way, a remarkable reducing of the contribution of the eddy currents to the total amount of the losses is obtained. Further, tensioning coverings have been developed, in order to obtain these improvements by creating localized compressive micro stresses. In this framework, it has been proposed to subject the sheet to shot blasting or to mechanical threading. Such methods can be applied with difficulty in the industry, destroy the insulating covering with exposure of the sheet to rapid oxidation, require further covering, and form flashes, whereby diminishing the spatial factor.

A successive solution, largely consolidated, has been to subject the surface of the sheet, as electromagnetic steel strip with oriented grains unwinding from coils, to scratching or threading (scribing) with energetic impulses concentrated in form of laser beams, plasma and similar.

In typical equipments for the treatment of scribing directed to the improvement of electromagnetic characteristics, the beam of a laser generator is deviated on the moving strip by a mirror scanner and then focused on the sheet along a scanning path transversal to the direction of advancing of the strip.

In order to obtain an appreciable reduction of the losses, the treatment of scribing should be of reduced cross-sectional dimensions, as an example 0.10 mm and extended at a maximum in depth. Good results have been obtained by using laser beams with spot of hardly elliptic section, lengthened in the sense transversal to the direction of advancing of the strip. It has been performed by means of suitable cylindrical optics.

SUMMARY OF THE INVENTION

The technical problem of the present invention is to accomplish a laser scribing installation, with spot having elliptic section, of high productivity, which results reliable and whose operating specifications can be easy adjusted within wide margins.

According to a first characteristic, the scribing installation comprises a laser generator, a cylindrical telescopic optic group with varying focal distance for the formation of an elliptic sectioned laser beam having varying ellipticity as function of the focal distances and a rotating mirror scanner for scanning the laser beam according to a pre-defined angle. The installation further comprises a parabolic reflector extended transversally to the strip, for receiving the scanned laser beam and focusing the beam on the strip, as a hardly lengthened elliptic spot, along a treatment path, and in which the telescopic group is adjustable for modifying the length of one of the axes in the elliptic section of the laser beam incident on the strip.

According to another characteristic, the laser scribing installation provides that the focus of the telescopic optic group is downstream of the mirror rotating scanner and in which the sense of rotation of the scanner is such that, on the incidence of the elliptic sectioned laser beam on a corner of the scanner and in the commutation between two adjacent mirrors, the beam has the trailing edge of the spot at the end extremity of the treatment path and the leading edge at the beginning extremity of the said path.

BRIEF DESCRIPTION OF THE DRAWINGS

The characteristics of the invention will become clear from the following description given by way of non-limiting example, with the aid of the appended drawings, in which:

FIGS. 4, 5, 6 and 7 show optical schemas of some components of FIG. 3 in different operating conditions;

FIG. 10 shows a view in enlarged scale of some components of the installation represented in FIG. 2;

FIG. 11 is a partial, frontal, schematic view of some components of the installation shown in FIG. 2;

DETAILED DESCRIPTION OF THE PREFERRED EMBODIMENTS

Figure 1:
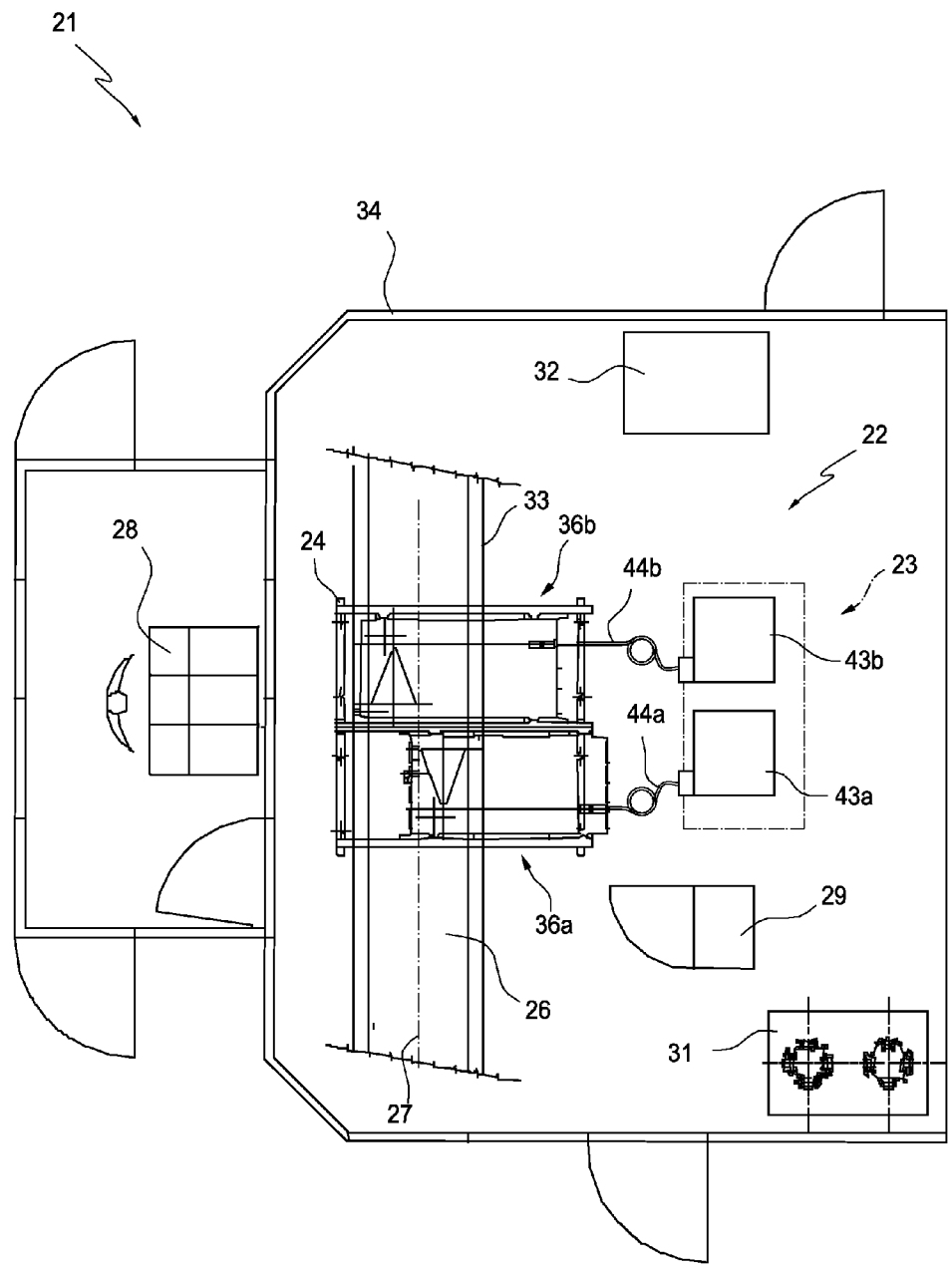
FIG. 1 represents the scheme of a system for the treatment of magnetic sheets, which uses a laser scribing installation according to the invention.

With reference to FIG. 1, a system for the treatment of magnetic sheets has been represented with 21. The system 21 provides an installation of laser scribing (treatment laser of the material) 22 with a respective generator group 23 and a support bench 24. The sheet is in the form of a strip 26 of electrotechnic silicon iron with grains oriented in the sense of the lamination. The strip is in motion along a longitudinal axis 27 as unwinding from a feeding coil and winding on a taking-up coil, not shown in drawings.

Moreover, the system 21 comprises a control console 28, a cabinet 29 for feed and control components, a chiller 31, and air filtering and ventilating unit 32 for the installation 22, while the support bench 24 has a horizontal plane 33 of support and sliding for the strip 26. Walls 34, with protection function, are arranged around the installation 22 with the generator 23 and the bench 24 and around the cabinet 29 and the units 31 and 32.

Figure 2:
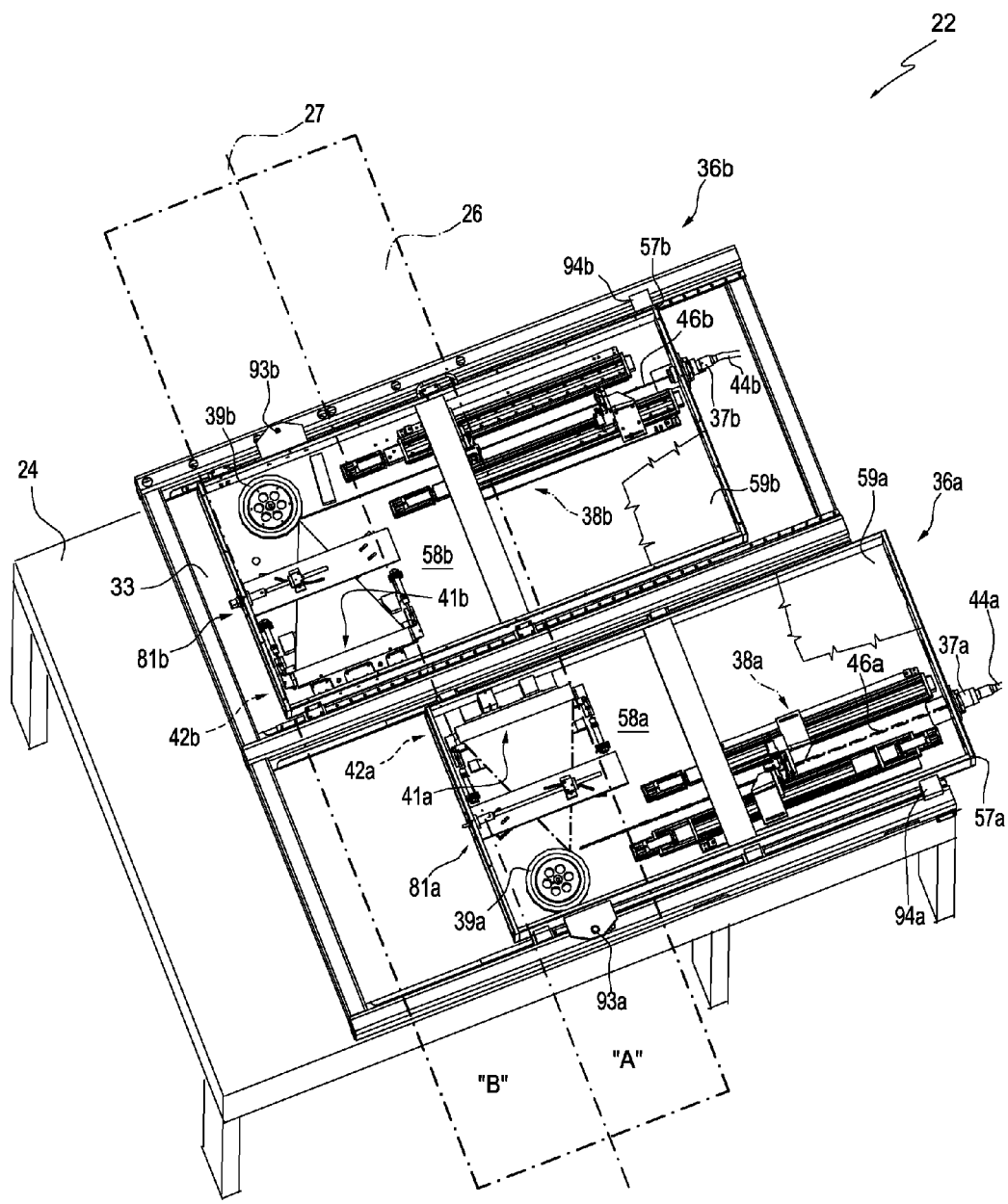
FIG. 2 shows a schematic plant view of a laser scribing installation in accordance with the invention.
Figure 8:
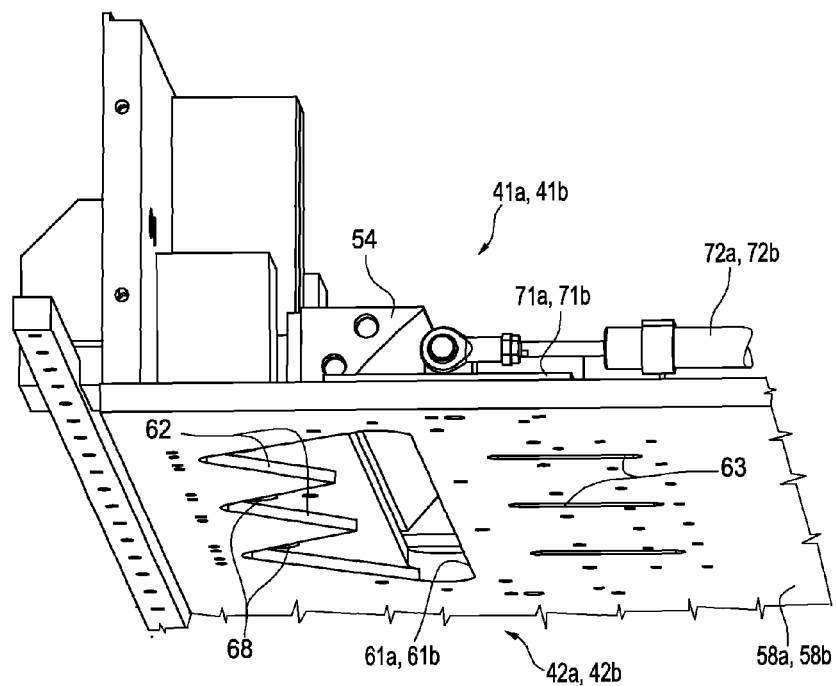
FIG. 8 is a partial schematic view, from the bottom, of some details of the laser scribing installation according to the invention.

In accordance with the invention, the laser scribing installation 22 (FIGS. 1 and 2) comprises two laser treatment unit 36a and 36b which include, respectively, a collimator 37a, 37b, an optical telescopic device 38a, 38b, a scanner 39a, 39b, a device of final focalization 41a, 41b and a device of protection 42a, 42b (FIG. 8).

The generator group 23 (FIG. 1) comprises two sources of laser beam 43a, 43b, as an example of Nd: Ytterbium type of 1.5÷2.5 Kw. The laser sources 43a, 43b have output on optical fibers 44a, 44b (FIG. 2) with spot of the scribing beam substantially circular, and in which the optical fibers are connected with the collimator 37a, 36b of the treatment unit 36a, 36b.

Figure 3:
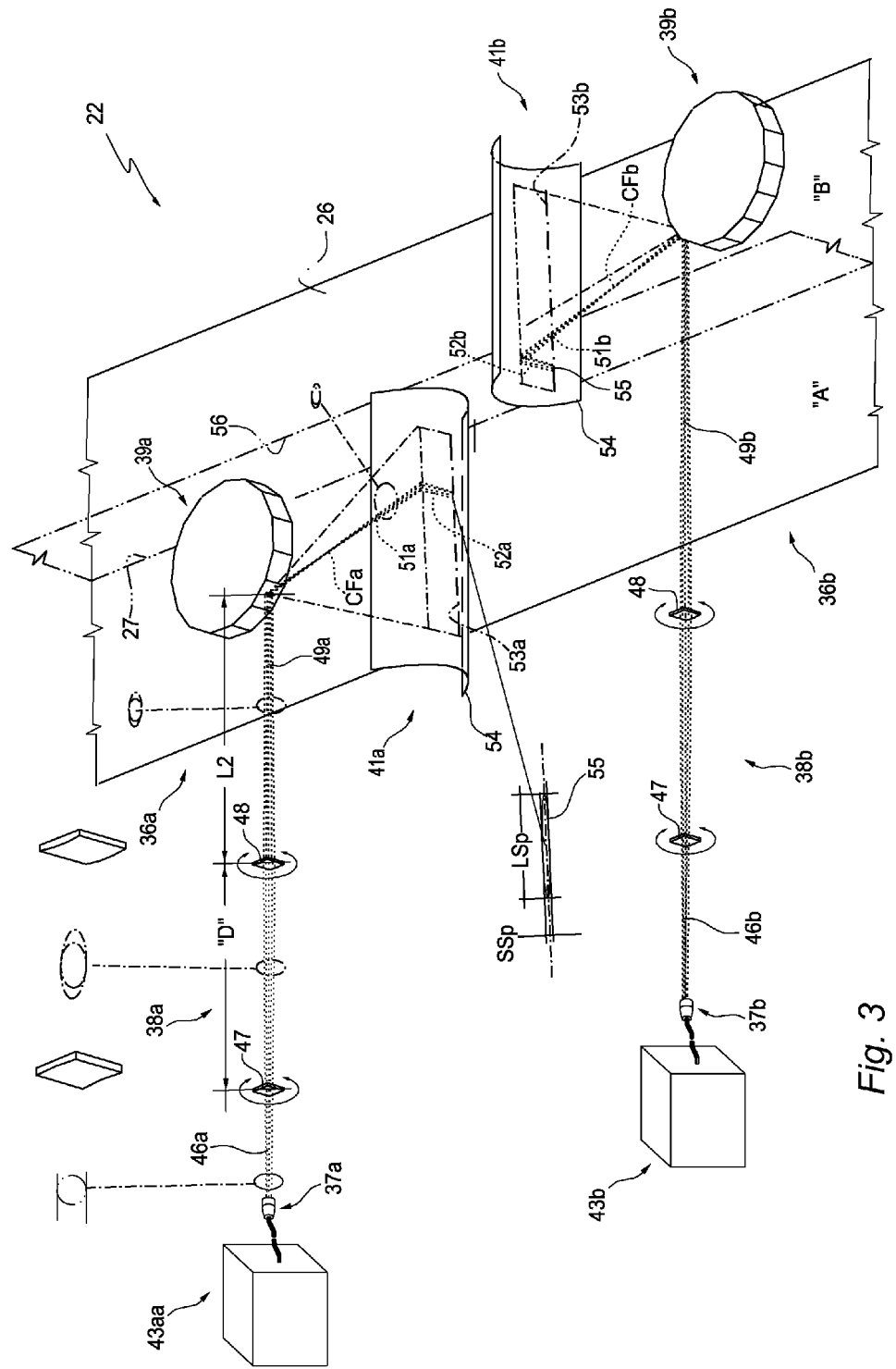
FIG. 3 represents an optical scheme of the laser scribing installation of FIG. 2.

The laser beams of the sources 43a, 43b, through the collimators 37a and 37b (FIG. 3), arrive, as collimated beams 46a, 46b, at the telescopic devices 38a and 38b, are addressed towards the scanners 39a and 39b and then focused on the strip 26 through the devices 41a and 41b. The protection devices 42a and 42b provide to maintain, in the use, the devices of final focalization 41a, 41b in conditions of maximum optical efficiency, avoiding contaminations by smoke produced in the treatments.

The optical telescopic device 38a, 38b (FIGS. 3, 4 and 6) has cylindrical lenses 47, 48 divergent and convergent, respectively, which transform the collimated beam 46a, 46b, of circular section, in a beam 49a, 49b of elliptic section, with horizontal axis X and vertical axis Y directed to the scanner 39a, 39b along a horizontal plane and from the scanner, as scanned beam 51a, 51b, on the device of final focalization 41a, 41b. Then, the laser beam is focused on the strip 26 along a vertical surface, as scribing beam 52a, 52b, scanned along a scanning path 53a, 53b substantially transversal with respect to the longitudinal axis 27 of the strip 26.

The distance "D" between the lenses 47 and 48 of the telescopic device is predisposed and is adjustable so as to obtain a variable focal length and a focus CFa, CFb downwardly of the scanner 38a, 38b. Consequently, the beam 49a, 49b has ellipticity variable as function of the focal length of the device 38a, 38b, with amplitude constant along the axis Y and depending on the focal length along the axis X. In alternative to the cylindrical lenses 47 and 48, the optical telescopic device 38a, 38b can include a couple of cylindrical mirrors, divergent and convergent, respectively, and returning mirrors and having possibility of adjustment of the distance between the mirrors.

The scanner 39a, 39b is of the type having planar mirrors on polygonal faxes and sharp corners between the mirrors, which rotates around a vertical axis. The scanner 39a, 39b receives the beam of elliptic section 49a, 49b and reflects the scanned beam 51a, 51b on the device of final focalization 41a, 41b, moving it according to an angle depending on the number of the mirrors.

In detail, the laser beam 51a, 51b (FIGS. 4 and 6) incident on the strip 26 defines an input front "LdSp" and an output front "TrSp" in the sense of movement, (represented by an arrow), along the treatment path 53a, 53b. When the convergent beam of elliptic section 49a, 49b hits with its axis the corner between the adjacent mirrors of the scanner, it is divided, as beam 51a, 51b, through the device of final focalization 41a, 41b, between the terminal extremity and the initial extremity of the treatment path. The focus CFa, CFb downwardly of the scanner, and the sense of rotation of the scanner are such that, at the moment of the incidence of the convergent beam 49a, 49b on a corner of the scanner and in the commutation between the adjacent mirrors (FIGS. 5 and 7), the beam presents the output front "TrSp" of the spot at the terminal extremity of the treatment path 53a, 53b and the input front "LdSp" at the initial extremity of the path, so as to uniform the treatment in the terminal areas of the strip.

In agreement with the invention, the device of final focalization 41a, 41b (FIGS. 2 and 3) comprises a reflector provided for receiving the scanned beam 51a, 51b and focusing the scribing beam 52a, 52b along the scanning path 53a, 53b of the strip 26. The reflector of the device 41a, 41b has a cylindrical sector 54 of parabolic section, with generatrix extended transversely to the strip 26, a little above the support bench 24. The distance "L2" between the lens 48 and the scanner 39a, 39b is adjustable for focusing the beam 51a, 51b on the strip 26 in function of the focal length of the device 38a, 38b.

As result, the beam of circular sectioned emerging from the collimator 37a, 37b, through the telescopic device 38a, 38b, the scanner 39a, 39b, and the device of final focalization 41a, 41b is transformed in a spot 55 hardly lengthened and of minimal transversal dimensions "Ssp", and in which the longer axis of the elliptic section is substantially parallel to the scanning path 53a, 53b. The length of the spot "Lsp" is settable by modifying the distances "D" and "L2" in dependency on the typology of the scribing, the velocity of the strip, the velocity of rotation of the scanner and the characteristics of the strip, for an optimization of the treatment.

Moreover, the lenses 47 and 48 of the telescopic optical group 38a, 38b have possibility of rotation in order to modify the angle of the spot with respect to the scanning path 53a, 53b. This for optimizing the alignment of spot the 55 with the scanning path as function of the velocity of rotation of the scanner 39a, 39b and the velocity of advancing of the strip 26.

The scanner 39a and the device of focalization 41a of the laser unit 36a is arranged offset and in specular way with respect to the scanner 39b and the device of focalization 41b of the unit 36b and specular with reference to a geometric vertical plane 56 passing through the longitudinal axis 27 of the strip. However, the telescopic device 38a and the telescopic device 38b are arranged by a same side of the plane 56. Further, all the optical components have a specular offset symmetry with respect to a geometric vertical plane perpendicular to the axis 27. With this structure, the laser treatment units 36a, 36b can scribing at high speed, effectively and with limited dimensions, two longitudinal halves "A" and "B" of the strip 26. The first functional group, constituted by the treatment unit 36a, works on the half "A" of the width of the strip in motion, with scanning path 53a, while the second functional group, constituted by the treatment unit 36b, works on the half "B" of the width of the strip in motion, with scanning path 53b.

Figure 9:
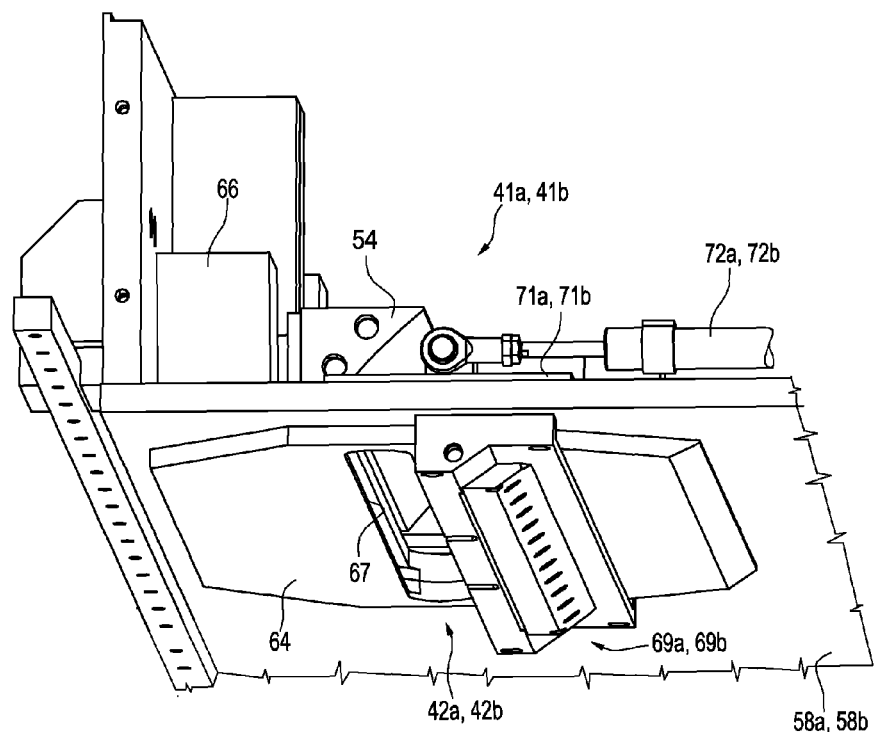
FIG. 9 is a partial schematic view, from the bottom, of other details of the laser scribing installation in accordance with the invention.

The laser treatment unit 36a, 36b includes a tray or basin 57a, 57b (FIG. 2) having a bottom 58a, 58b and a cover 59a, 59b and connected with the filtering and ventilating unit 32 in order to maintain in a dry and clean environment the optical components including the collimator 37a, 37b, the telescopic device 38a, 38b, the scanner 39a, 39b, and the device of focalization 41a, 41b. The bottom 58a, 58b is arranged between the support plane 33 and the device of focalization 41a, 41b (FIGS. 8, 9 and 11) and defines a limiting plate between the surface of the strip and the optical device 41a, 41b. A window 61a, 61b is defined transversely in the bottom 58a, 58b for the passage of the scribing laser beam 52a, 52b directed to the scanning path 53a, 53b of the strip 26.

In agreement with a characteristic of the invention, the protection device 42a, 42b is designated for generating an air barrier tangent to the window 61a, 61b to the end of preventing the optical device 41a, 41b by contaminations due to residual of smoke. In detail, the device 42a, 42b comprises "V" shaped creeks 62 along a rear edge of the window 61a, 61b, a series of slots 63 in the bottom 58a and 58b, upwardly from the window 61a, 61b, a boxed cover 64 and an exhausting fan 66. The cover 64 is mounted below the bottom 58a and 58b, as cover for the creeks 62 and the slots 63, and defines a slit 67 in registration with the window 61a, 61b for the passage of the scribing laser beam focused by the device 41a, 41b. The exhausting fan 66 is connected to a flange with a series of holes 68 between the creeks 62 and generates an airflow with input from the slots 63 and output from the holes 68, through the creeks to "V" 62. The airflow forms, with the clean air of the basin 57a, 57b, a gaseous lamina between the bottom 58a, 58b and the cover 64, tangent to the window 61a, 61b and the slit 67, which constitutes the air barrier of protection for the optical device 41a, 41b.

Moreover, in association with the protection device 42a, 42b the treatment unit 36a, 36b includes a ventilation group 69a, 69b, mounted below the bottom 58a and 58b and aspiration conduits, not shown in the figures, for addressing an airblast towards the steel strip 26 in the area of treatment of the half "A", "B". It to the end of removing the smoke produced by the treatment of the strip and with function of pre-barrier for the slit 67. A sliding shutter 71a, 71b, controlled by actuators 72a, 72b, is provided for closing the window 61a, 61b, in conditions of rest of the installation 22.

Each telescopic device 38a and 38b (FIGS. 2 and 10) comprises a structure of guide constituted by two prismatic guides 74 and 76 parallel to the axes of the collimated beams 46a and 46b and two carriages 77 and 78. The prismatic guides 74 and 76 are mounted on the bottom 58a, 58b, adjacent to the scanner 39a and 39b and by a same side with respect to the plane 56. The carriages are of cantilever support for the lenses 47 and 48, for aligning the optic axes of the lenses with the axis of the collimated beam 46a, 46b. The carriages 77 and 78 are motorized for being moved one with respect to the other and relatively to the scanners 39a and 39b, along the prismatic guides 74 and 76, in function of the focal to be obtained.

Figure 13:
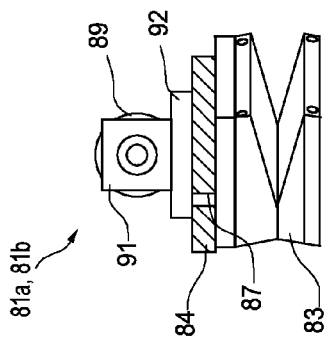
FIG. 13 is a lateral schematic view, partially sectioned, of the device of FIG. 12.
Figure 12:
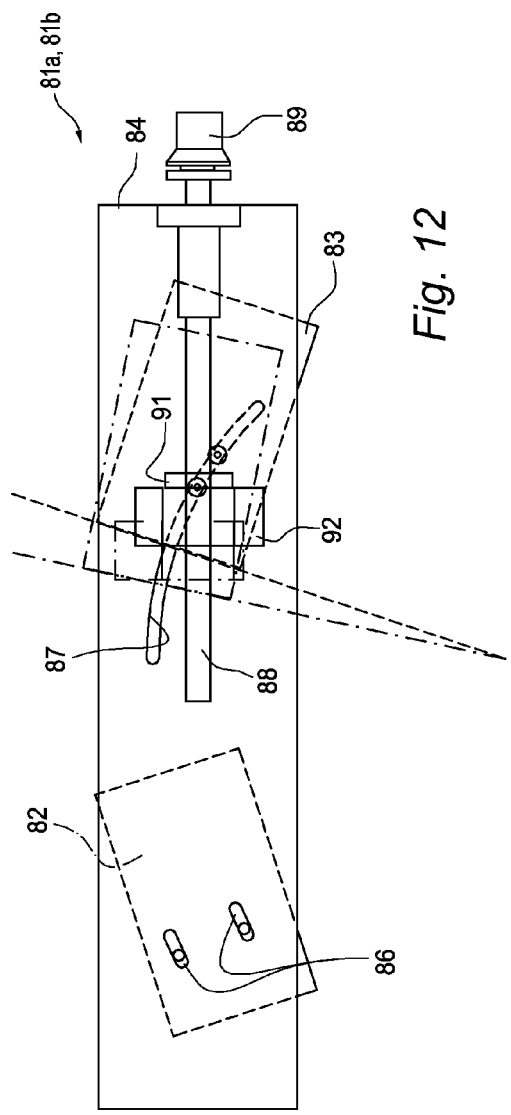
FIG. 12 shows a plant schematic view of a device of the laser installation according to the invention.
Figure 14:
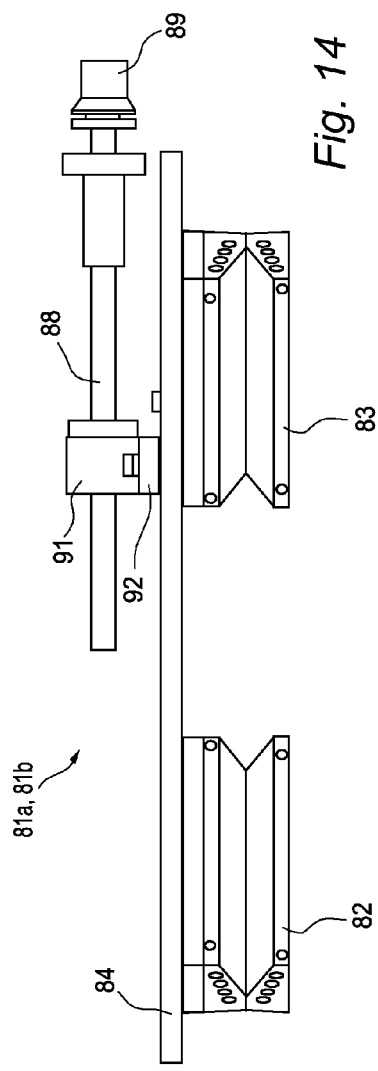
FIG. 14 represents a frontal schematic view of the device shown in FIG. 12.

Conveniently, each laser treatment unit 36a and 36b comprises a limiting device 81a, 81b (FIGS. 2 and 11) interposed between the scanner 39a, 39b and the device of focalization 41a, 41b, including two deadning banks 82 and 83 (FIGS. 12, 13 and 14), with possibility of adjustment, for limiting the width of the laser beam directed to the respective half "A", "B" of the strip 26 in dependence on the width of the strip 26.

In particular, the limiting device 81a, 81b comprises a bar 84 mounted on the bottom 58a, 58b, a little below the cover 59a, 59b, transversely to the plane 56 and provided of mounting slots 86 and a mounting and guide slot 87. The bar 84 supports, on an upper portion, a long screw 88 with a terminal handle 89 and a carriage 91, of mounting for a slider 92, engaged with the screw 84. On a lower portion, the bar 84 supports the deadening banks 83 and 84, respectively, through the mounting slots 86 and the mounting and guide slot 87. The deadening banks 82 and 83 are constituted by cooled metallic blocks, which define, in negative, a wedge shaped cavity, of trap for the laser beam to be absorbed.

The limiting device 81a is arranged offset and in specular way with respect to the limiting device 81b, with reference to the vertical plane 56, and such that the deadening bank 83 is adjacent to the plane 56. Through the slots 86, the deadening bank 82 is manually adjustable in position and inclination along the bar 44 in manner that a side of the bank 82 is tangent to the scanned laser beam 51a, 51b addressed towards the extremity of the scanning path 53a, 53b correspondent to the axis 27 of the steel strip 26.

The mounting and guide slot 87 of each device 81a, 81b has a circular profile with axis on the area of reception of the respective scanner 39a, 39b, while the deadening bank 84 is mounted, through pins and in flowing way, on the notch 87 and, through the notch, on the slider 92. Upon rotation of the handle 89 and consequent movement of the carriage 91, the bank 84 moves along the bar 44 and is automatically rotated so as to maintain a side tangent to the scanned laser beam 51a, 51b addressed towards the other extremity of the scanning path 53a, 53b corresponding to the edges of the strip 26.

Optionally, the basins 57a and 57b (FIG. 2) have possibility of rotation, relatively to the support bench 24 around vertical axes 93a and 93b, through adjusting elements 94a and 94b. The axes 93a and 93b are in proximity of an extremity of an external side of the basins 57a and 57b, adjacent to the scanners 39a and 39b. The adjusting elements 94a and 94b, as an example of screw type, are arranged in proximity of the other extremity of the external side and are designated for modifying the angle of the scanning path 53a, 53b with respect to a transversal direction of the strip 26.

The support bench 24 comprises a series of magnets 96 (FIG. 11) mounted below the plane 33, so as to hold the strip 26 in contact with the plane. It prevents raisings and vibrations of the strip with de-focusing of the laser beam and assuring that the spot of the scribing beam is of constant dimensions. The sliding surface of the plane 33 is flat and covered by a sheet 97 of plastic material such to avoid scratches due to the advance of the strip in condition of stresses.

The laser scribing installation 22 comprises a television unit 98 with two linear television cameras 99a and 99b, illuminators and image analyzing units, not shown in the figures. The acquired images are blocked and analyzed on the basis of Fourier transformers, in function of the composing lines and the spacing between the lines, for verifying the presence of visible damaging, consequent to the treatment, and for furnishing indications on parameters associated to the treatment. These indications can be used by an operator of the console 28, through a screen and other devices of signaling, for respective adjustments.

In particular, the installation 22 is in a position of performing a laser scribing effective for reducing the losses and improve the magnetic characteristics of the sheet, without visibly modifying the protecting layers of the covering. When it is requested, the television unit is used for signaling the arise of visible traces.

In alternative, the scribing installation can achieve a visible scribing and the television unit is used for furnishing information directed to regularize the visible traces according to the specification of the treatment.

Naturally, the principle of the invention remaining the same, the embodiments and the details of construction of the scribing installation for the superficial treatment of magnetic sheets can be widely modified with respect to what has been described and illustrated, by way of non limitative example, without by this departing from the scope of the present claimed invention.

As an example, the optical configuration which, in the commutation between adjacent mirrors, assures that the beam presents the output front of the spot at the terminal extremity of the treatment path and the input front of the spot at the initial extremity of the path can be applied also to an installation in which the focalization of the beam on the strip is effected by one or more cylindrical lenses faced to one or more windows of the support plane.

It is clear that, independently of other limitations, the laser scribing installation 22 comprises a laser beam generator, a scanner for scanning the laser beam and a cylindrical optical device extended transversely to the strip and in proximity of the strip for receiving the scanned beam and focusing the beam on the strip along the treatment area. The installation is characterized in that it comprises a limiting plate between the surface of the strip and the optical device of focalization and a relative device of protection, in which the limiting plate defines a window for the laser beam directed to the treatment area and in which the device of protection is pre-set for generating a gaseous lamina between the limiting plane and the strip, adjacent to the window, with function of gaseous barrier in the area of the window.

It is also clear that, independently of other limitations, the installation 22 comprises a laser beam generator, a rotating mirror scanner for scanning the laser beam according to a given angle, a focalizing device extended transversally to and in proximity of the strip for receiving the scanned beam and focusing the beam on the treating area of the strip. The installation is characterized in that it comprises a limiting device interposed between the scanner and the optical focalizing device and including two deadening banks for adjusting the angle of the sector of scanning of the laser beam, and in which the banks have possibility of regulation for limiting the amplitude of the beam in dependence on the width of the strip It is further clear that, independently of other limitations, the laser scribing installation 22 comprises two groups of laser treatment, including each one a generator of laser beam, a scanner for scanning the laser beam, and an optical focalizing device extended transversally to and in proximity of the strip for receiving the scanned beam and focusing the beam on the treating area. The scanner and the optical device of the groups of laser treatment are arranged offset and specularly with respect to a surface passing through the longitudinal axis of the strip to the end of treating two half in longitudinal sense of the strip.

At last, independently of other limitations, the laser scribing installation 22 comprises a generator of laser beam, a scanner for scanning the laser beam according to a pre-defined angle, an optical focalizing device extended transversally to the strip and in proximity of the strip for receiving the scanned beam and focusing the beam on the treating area. The installation is characterized in that it further comprises a support frame with a surface of reference for said strip and a series of magnets for holding the strip adherent to said surface.

The invention claimed is:

1. A laser scribing installation for treatment of grain oriented magnetic sheets, as a strip advancing on a planar surface along a longitudinal direction of movement, said installation comprising a laser generator, a cylindrical telescopic optical group with varying focal distance for formation of an elliptic sectioned laser beam, and a rotating mirror scanner for scanning the laser beam according to a pre-defined angle, wherein said installation further comprises:
a parabolic reflector extended transversally to the strip for receiving the laser beam from the rotating mirror scanner and focusing the beam on the strip, as a lengthened elliptic spot, along a treatment path;
a limiting plate arranged between the strip and the parabolic reflector and defining a window for the laser beam directed to the treatment path, and
a protection device for generating a gaseous lamina between the limiting plate and the strip, adjacent to the said window;
wherein said laser beam defines, in an elliptic section, axes of varying ellipticity as function of said focal distance;
wherein said telescopic optical group is adjustable for modifying the length of one of said axes of the laser beam incident on said strip; and
wherein said gaseous lamina has function of gaseous barrier tangent to said window for protecting said parabolic reflector from contamination.

2. The laser scribing installation according to claim 1 wherein said telescopic optical group comprises a structure of guide with two carriages of support for two motorized optical subgroups, and wherein said carriages are shiftable along the structure of guide as function of said focal distance to be defined and for addressing the beam toward said rotating mirror scanner.

3. The laser scribing installation according to claim 1 wherein the installation further comprises a laser deadening device interposed between the rotating mirror scanner and the parabolic reflector, and wherein said laser deadening device includes two deadening banks arranged transversely to the laser beam scanned by the rotating mirror scanner, two deadening banks being positionable for limiting an amplitude of the laser beam on the strip.

4. The laser scribing installation according to claim 1, wherein said strip has a longitudinal axis and defines a width transversely to said longitudinal axis and the longitudinal direction of movement, wherein the laser generator, the telescopic optical group, the rotating mirror scanner and the parabolic reflector define a first functional group for treating a half (A) of said width on the strip in movement, and wherein said installation further comprises a second functional group, including another laser generator, another telescopic optical group, another scanner and another reflector for treating the other half (B) of said width, the scanner and the reflector of the first functional group being arranged above and at a side of the strip, while the scanner and the reflector of the second functional group being arranged above and at an opposite side of the strip, with respect to a geometric surface perpendicular to said planar surface and passing through the longitudinal axis of said strip.

5. The laser scribing installation according to claim 1 further comprising a tray or basin for lodging the telescopic optical group, the scanner and the reflector and an air filtering and ventilating unit in connection with said tray or basin for maintaining in a dry and clean environment said telescopic optical group, said scanner and said reflector.

6. The laser scribing installation according to claim 5 wherein said tray or basin is of support for the telescopic optical group, the scanner and the reflector, said tray or basin includes a bottom and a cover and wherein said bottom defines said limiting plate.

7. The laser scribing installation according to claim 1 wherein said lengthened elliptic spot has a longer axis forming an inclination angle with respect to the treatment path, and wherein the cylindrical telescopic optical group has cylindrical lenses and means for rotating said cylindrical lenses in order to modify the inclination angle of the spot with respect to the treatment path.

8. The laser scribing installation according to claim 1, wherein the laser beam incident on the strip is provided for moving along the treatment path according to a beam sense of movement from an initial extremity to a terminal extremity of said path, while said lengthened elliptic spot defines a leading edge and a trailing edge with respect to said beam sense of movement, the rotating mirror scanner has planar mirrors on polygonal faces and sharp corners between the mirrors, and wherein the cylindrical telescopic optical group has a focus downstream of the rotating mirror scanner and so that, during the incidence of the elliptic sectioned laser beam on a corner of the scanner and in a commutation between adjacent ones of the mirrors, said laser beam has the trailing edge of the spot at the terminal extremity of the treatment path and the leading edge at the initial extremity of the said path.

9. A laser scribing installation for treatment of grain oriented magnetic sheets, as strip advancing along a longitudinal direction of movement, comprising a laser generator, a cylindrical telescopic optical group with variable focus for formation of a laser beam of elliptic section, a rotating mirror scanner for scanning the laser beam of elliptic section according to a pre-defined angle and a cylindrical optical focusing device,
  wherein said cylindrical optical focusing device is extended transversally to the strip and in proximity of the strip for receiving the laser beam from the scanner and focusing the laser beam on the strip along a treatment path as elliptic spot;
  wherein the rotating mirror scanner has planar mirrors on polygonal faces and sharp corners between the mirrors;
  wherein the laser beam incident on the strip is provided for moving along the treatment path according to a beam sense of movement from an initial extremity to a terminal extremity of the treatment path while said elliptic spot defines a leading edge and a trailing edge in the beam sense of movement along said treatment path; and
  wherein the telescopic optical group has a focus downstream of the mirror rotating scanner and a sense of rotation of the mirror scanner is such that, during the incidence of the elliptic sectioned laser beam on a corner of the scanner and in a commutation between two adjacent ones of the mirrors, the laser beam scanner by the mirror scanner is convergent and divided as two beams through the cylindrical optical focusing device directed, respectively, to the initial extremity and the terminal extremity of the treatment path, with the trailing edge of the spot at the terminal extremity of the treatment path and the leading edge at the initial extremity of the path.

10. A laser scribing installation for treatment of grain oriented magnetic sheets, as strip in longitudinal movement on a planar surface, comprising a generator of laser beam, a scanner for scanning the laser beam and an optical focalizing device and wherein the focalizing device is extended transversally to the strip and in proximity of the strip for receiving the scanned beam and focusing the beam on the strip along a treatment path; the installation further comprising
  a tray or basin for lodging the scanner and the optical focalizing device, an air filtering and ventilating unit in connection with said tray or basin, and a protection device;
  said tray or basin includes, as a bottom, a limiting plate between the surface of the strip and the optical focalizing device and which defines a window for the laser beam directed to the treatment path of the strip;
  the air filtering and ventilating unit is provided for maintaining in a dry and clean environment the scanner and the optical focalizing device; and
  wherein said protection device is pre-set for generating a gaseous lamina between the limiting plate and the strip, adjacent to the window, with function of gaseous barrier tangent to the window for protecting the optical focalizing device from contamination.

11. The laser scribing installation according to claim 10 wherein the protection device generates the gaseous lamina with the air of the clean environment.

12. The laser scribing installation according to claim 11,
  wherein said limiting plate defines openings upstream and downstream of said window;
  wherein said protection device comprises a boxed cover and an exhausting fan;
  wherein the boxed cover is mounted on the limiting plate and defines a slit in registration with the window for passage of the laser beam directed to the treatment path of the strip; and
  wherein said exhausting fan generates an airflow with input and output through said openings with the clean environment of said tray or basin, and forms said gaseous barrier between the limiting plate and the boxed cover, tangent to the window and the slit.

13. The laser scribing installation according to claim 10 wherein the installation further includes a telescopic optical group for formation of an elliptic sectioned beam having different axes of ellipticity and means for adjusting said telescopic optical group for modifying a length of one of said axes of the elliptic sectioned beam.

14. The laser scribing installation according to claim 10 wherein the installation further comprises a television unit with linear television cameras and image processors, for stopping and analyzing images and verifying presence of visible damages and for supplying indications on parameters associated with said treatment.

15. A laser scribing installation for treatment of grain oriented magnetic sheets in shape of strip in movement comprising a generator of laser beam, a rotating mirror scanner for scanning the laser beam according to a pre-defined angle, an optical focalizing device extended transversally to the strip and in proximity of the strip for receiving the scanned beam and focusing the beam on a treatment path of the strip, the installation further comprising a limiting device interposed between the scanner and the optical focalizing device and including two deadening banks arranged transversely to the laser beam scanned by the scanner for fixing limits to said pre-defined angle of the laser beam, wherein said deadening banks include cooled metallic blocks, which define respective side parts having shaped cavities, of trap for the laser beam to be absorbed.

16. The laser scribing installation according to claim 15 wherein said deadening banks are adjustable in position and inclination in order to position said side parts in condition of tangency with the laser beam and in correspondence of the limits fixed for said pre-defined angle.

17. A laser scribing installation for treatment of grain oriented magnetic sheets in shape of a strip advancing along a longitudinal direction of movement, by means of a laser beam transversally scanned with respect to the strip, the installation further comprising a support frame with a surface of reference for said strip, two groups of laser treatment, including each one a generator for a laser beam, a scanner for scanning a laser beam from said generator, an optical focalizing device extended transversally to the strip and in proximity of the strip for receiving a scanned beam from said scanner and focusing the scanned beam on a treatment path of the strip transversal to said longitudinal direction of movement, a tray or basin for lodging the generator, the scanner and the optical focalizing device, and wherein:
- said strip has a longitudinal axis delimits two longitudinal halves of the strip and defines a geometric surface perpendicular to said strip and passing through said longitudinal axis,
- the scanner and the optical device of said groups of laser treatment are arranged offset and specularly to one another with respect to said geometric surface to an end of treating said two longitudinal halves of the strips according to a predetermined angle with respect to the longitudinal direction of movement of the strip;
- each tray or basin is rotatably mounted on said support frame around a respective axis perpendicular to said surface of reference; and
- said scribing installation further comprises means for rotating the tray or basin of the groups of laser treatment in order to modify the angle of the treatment path with respect to a transversal direction of the strip.

18. The laser scribing installation according to claim 17 further comprising a series of magnets for holding the strip adherent to said surface of reference.

19. The laser scribing installation according to claim 12 further comprising a ventilation group for directing a throw of air on the treatment path, tangent to the slit for evacuation of smoke of the treatment.

20. A laser scribing installation for treatment of grain oriented magnetic sheets, as strip in longitudinal movement, comprising a generator of laser beam, a scanner for scanning the laser beam and an optical focalizing device, wherein the optical focalizing device is extended transversally to the strip and in proximity of the strip for receiving the scanned beam and focusing the beam on the strip along a treatment path; said installation further comprising:
- a tray or basin for lodging the scanner and the optical focalizing device, an air filtering and ventilating unit in connection with said tray or basin, and a protection device, and in which said tray or basin includes, as a bottom, a limiting plate between a surface of the strip and the optical focalizing device;
- wherein said air filtering and ventilating unit is provided for maintaining in a dry and clean environment the scanner and the optical focalizing device
- wherein said limiting plate defines a window for the laser beam directed to the treatment path of the strip and openings upstream and downstream of said window; and
- wherein said protection device is provided for generating a gaseous lamina between the limiting plate and the strip, adjacent to the window, with function of gaseous barrier for protecting the optical focalizing device from contamination;
- wherein said protection device comprises a boxed cover mounted on the limiting plate and an exhausting fan;
- wherein said cover defines a slit in registration with the window for passage of the laser beam directed to the treatment path of the strip, and
- wherein said exhausting fan generates an airflow with input and output through said openings with the clean environment of said tray or basin, and forming said gaseous barrier between the limiting plate and the boxed cover, tangent to the window and the slit.

\* \* \* \* \*